C. T. ANDERSON.
Churn.
No. 32,553.
Patented June 18, 1861.
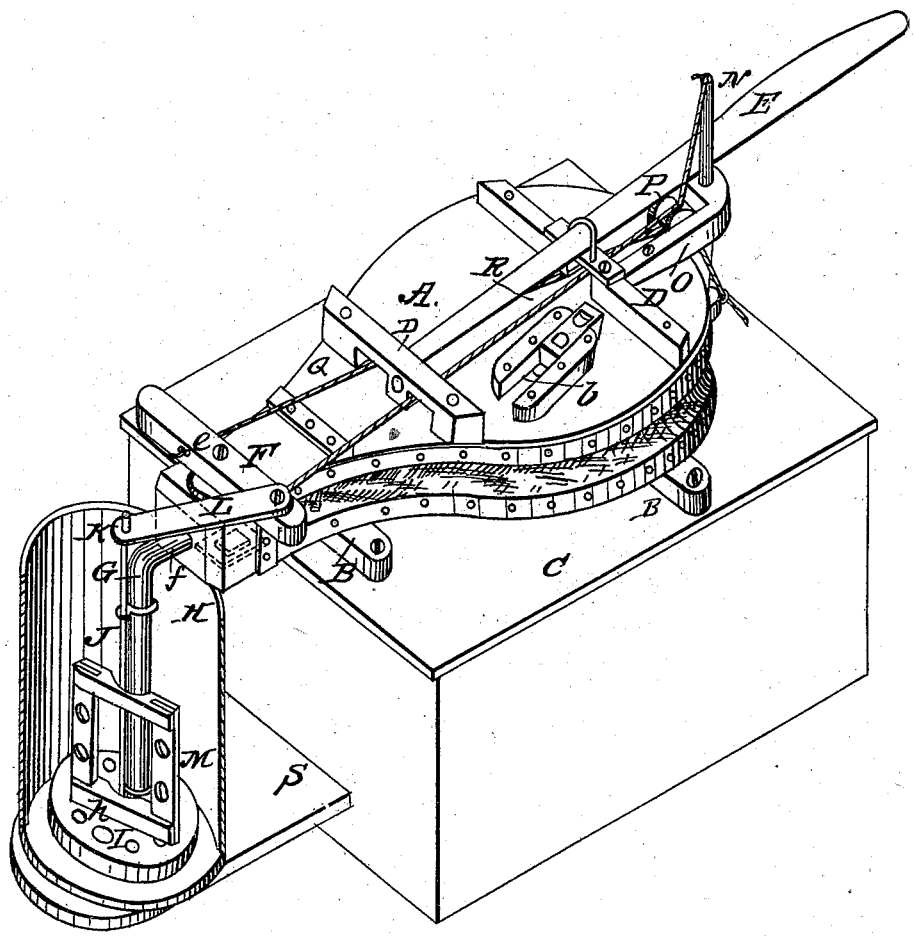
Witnesses
Octavius Knight
James M. Gr'dHip
Inventor
C. T. Anderson
By Munn & Co
Attys
Munn & Co.

UNITED STATES PATENT OFFICE.

CHARLES T. ANDERSON, OF HYATTSTOWN, MARYLAND.

CHURN.

Specification of Letters Patent No. 32,553, dated June 18, 1861.

*To all whom it may concern:*

Be it known that I, CHARLES T. ANDERSON, of Hyattstown, in the county of Montgomery and State of Maryland, have invented a new and useful Improvement in Churns; and I do hereby declare that the following is a full, clear, and exact description of the same, reference being had to the accompanying drawing, making part of this specification and being a perspective view of my said invention.

To enable others skilled in the art to make and use my invention I will proceed to describe its construction and operation with reference to the drawing.

A, represents a pair of bellows of ordinary construction provided on the upper side with a valve guarded aperture $b$, which is capable of being adjusted in capacity, to regulate the blast of the bellows. The bellows are mounted upon two transverse bars B, B, secured to the top of the box C.

D, D, are cross pieces fastened to the upper portion of the bellows. E, is a handle rigidly attached to the said cross pieces for the purpose of actuating the bellows and churn dasher as hereinafter explained.

F, is a lever supported upon a boss near the nozzle of the bellows and attached thereto by means of a screw bolt $e$, which forms the fulcrum of the lever.

G, is a tube or nozzle in the form of a knee, the short end $f$, of which is fitted into the end of the bellows and the other end extends downwardly and rests upon the bottom of the vessel.

H, represents a firkin which contains the cream. It is not necessary however that the said vessel be a firkin, it may be a common water pail, a can, or box, or any suitable vessel, its office being merely to hold the cream and only a muslin cover required.

S, is a platform attached to one side of the box and supporting the cream receptacle.

I, is a disk through one side of which the tube G, passes and to which it is attached. The tube passes below the disk and rests upon the bottom of the cream receptacle, and thereby allows a free circulation of the cream under the disk. The disk is supported otherwise than upon the tube by legs $g, g$, attached to the under side thereof and resting upon the bottom of the cream receptacle.

As the lower end of the tube rests upon the bottom of the cream receptacle, all communication with the bellows through that end is cut off. Provision is however made for a communication between the receptacle and bellows by forming a series of perforations in the sides of the tube below the disk.

$h, h,$ are apertures in the disk.

J, is a staff or dasher rod supported near its upper end in a line with the vertical tube by means of a yoke which also forms a bearing for the same to vibrate in.

K, is a crank secured upon the upper end of the dasher rod and connected to one end of the lever F, by means of a link or arm L, which when the bellows are operated imparts a vibrating movement to the dasher, M, which is fastened upon the rod or staff J.

N, is a post fixed in a pedestal attached to the box C, at the rear end of the bellows.

O, is a forked bracket fastened to the top of the bellows and projecting at the rear thereof, and provided with a hole through it which allows it to move up and down on the post.

P, is a roller journaled in the bracket between the tines of the forked brace.

Q, is a cord attached to the top of the post passing under the roller P, and connected to one side of the lever F. R is another cord attached to the pedestal of the post N, passing over the roller P, and connected to the opposite end of the lever F.

Under the forward end of the bellows and communicating therewith is an aperture which is provided on its inner side with a valve (shown in dotted lines) which opens and closes alternately with the action of the bellows.

Operation: The vessel being filled with cream, an up and down or vibratory movement is given to the upper portion of the bellows by means of the handle and a current of air thereby forced through the nozzle of the bellows into the cream through the apertures of the lower end of the nozzle. At the same time a vibrating motion is imparted to the dasher. The valve under the forward end of the bellows admits air to the forward part of the bellows as it expands and thereby prevents the cream being drawn up into the nozzle and bellows. The aperture on the top of the bellows is capable of being adjusted in size to regulate the quantity of air passing into the cream or it can be closed entirely, and only the dasher used for churning, but the combined action of the two is found to be much more effective. When it is desired to remove the vessel after churning it is done by simply unhooking the link or arm from the crank, and withdrawing the nozzle from the bellows when the vessel is free to be removed. To separate the dasher from the nozzle, the disk I, is turned thereon until the axis of the dasher projects over its side, when the dasher may be readily unshipped.

What I claim as new and of my invention herein, and desire to secure by Letters Patent, is,

1. The combination with the bellows A, and vertical nozzle G, of the pivoted reciprocating dasher M, constructed and operated substantially as and for the purposes set forth.

2. The described combination of the nozzle G, detachable dasher M, and eccentrically pivoted disk I, arranged and operating as explained.

CHARLES T. ANDERSON.

Witnesses:
Thos. Norwood,
Joseph R. Smith.